(12) United States Patent
Powell (10) Patent No.: US 8,714,321 B2
(45) Date of Patent: May 6, 2014

(54) LONG TRAVEL SHOCK ABSORBER

(76) Inventor: Douglas Hunter Powell, Eldorado Hills, CA (US)

( * ) Notice: Subject to any disclaimer, the term of this patent is extended or adjusted under 35 U.S.C. 154(b) by 178 days.

(21) Appl. No.: 13/302,981

(22) Filed: Nov. 22, 2011

(65) Prior Publication Data

US 2012/0306133 A1    Dec. 6, 2012

Related U.S. Application Data

(60) Provisional application No. 61/520,240, filed on Jun. 6, 2011.

(51) Int. Cl.
*F16F 9/06* (2006.01)

(52) U.S. Cl.
USPC ........................ 188/314; 188/321.11

(58) Field of Classification Search
USPC ............ 188/297, 303, 304, 312, 314, 321.11, 188/322.19; 267/118, 124, 126, 127
See application file for complete search history.

(56) References Cited

U.S. PATENT DOCUMENTS

| | | | |
|---|---|---|---|
| 1,595,330 A | 8/1926 | Woodward | |
| 2,363,485 A | 11/1944 | Down | |
| 2,653,683 A | 9/1953 | Strauss | |
| 2,676,676 A | 4/1954 | Strauss et al. | |
| 3,101,131 A | 8/1963 | Bourcier De Carbon et al. | |
| 3,378,110 A | 4/1968 | Parrish, Jr. | |
| 3,447,797 A | 6/1969 | Roberts | |
| 3,731,914 A | 5/1973 | Cope et al. | |
| 3,854,710 A * | 12/1974 | Nicholls | 280/6.159 |
| 4,061,320 A | 12/1977 | Warner | |
| 4,145,036 A | 3/1979 | Moonen et al. | |
| 4,311,302 A | 1/1982 | Heyer et al. | |
| 4,408,751 A | 10/1983 | Dodson et al. | |
| 4,832,318 A | 5/1989 | Wang | |
| 5,096,168 A * | 3/1992 | Takehara et al. | 267/220 |
| 5,409,087 A | 4/1995 | Angermann et al. | |
| 5,454,550 A | 10/1995 | Christopherson | |
| 5,660,379 A * | 8/1997 | Oest | 267/126 |
| 5,667,031 A | 9/1997 | Karpik | |
| 5,810,128 A | 9/1998 | Eriksson et al. | |
| 6,105,740 A | 8/2000 | Marzocchi et al. | |
| 6,244,398 B1 | 6/2001 | Girvin et al. | |
| 6,374,966 B1 | 4/2002 | Lillbacka | |
| 6,556,907 B1 * | 4/2003 | Sakai | 701/37 |
| 6,725,983 B2 | 4/2004 | Bell | |
| 6,776,269 B1 | 8/2004 | Schel | |
| 6,883,650 B2 | 4/2005 | Van Wonderen et al. | |
| 7,281,704 B2 * | 10/2007 | Salice | 267/124 |
| 7,478,708 B2 * | 1/2009 | Bugaj | 188/304 |
| 7,513,490 B2 | 4/2009 | Robertson | |
| 8,047,343 B1 * | 11/2011 | Chen | 188/322.19 |
| 2003/0051957 A1 | 3/2003 | Lemieux | |

(Continued)

FOREIGN PATENT DOCUMENTS

WO    WO 9313954 A1 *    7/1993

*Primary Examiner* — Anna Momper (74) *Attorney, Agent, or Firm* — Superior IP, PLLC; Dustin L. Call (57) ABSTRACT

One example embodiment includes a fluid based shock absorber. The fluid based shock absorber includes a first assembly. The first assembly includes a first compression chamber. The first assembly also includes a first sliding member. At least a portion of the first sliding member is configured to remain within the first compression chamber and the first sliding member is configured to move in a first direction relative to the first compression chamber.

15 Claims, 9 Drawing Sheets

(56) References Cited

U.S. PATENT DOCUMENTS

2004/0119217 A1  6/2004  Kon
2006/0163017 A1  7/2006  Verriet
2009/0315376 A1* 12/2009 Nishiwaki .................. 297/301.2
2011/0162928 A1* 7/2011 Wilson ..................... 188/322.19

* cited by examiner

LONG TRAVEL SHOCK ABSORBER

CROSS-REFERENCE TO RELATED APPLICATIONS

This application claims the benefit of and priority to U.S. Provisional Patent Application Ser. No. 61/520,240 filed on Jun. 6, 2011, which application is incorporated herein by reference in its entirety.

BACKGROUND OF THE INVENTION

Shock absorbers are a common mechanical component in vehicles. For example, shock absorbers are found in cars, trucks, SUVs, semi-trucks, construction equipment, off-road vehicles and even industrial equipment. Shock absorbers are designed to dampen or reduce vertical motion of the vehicle when the wheels of the vehicle encounter a bump or a dip. In particular, shock absorbers dampen force, motion and energy between the passenger compartment of the vehicle and the wheels of the vehicle. Shock absorbers use pneumatic and/or hydraulic forces to reduce the speed at which the vehicle moves in a vertical direction in response to changing terrain, even when the wheels move toward or away from the vehicle. I.e., if a force tends to move the wheels toward the vehicle, such as a bump, the shock absorber dissipates the energy behind the force thus reducing the amplitude of the motion of the passenger compartment relative to the wheels.

However, shock absorbers suffer from a number of drawbacks. For example, the distance that the shock absorber can expand or stroke relative to its fully contracted length is limited in magnitude to a length that is less than the length of the shock body or compression chamber. I.e., the amount that one piston and shaft assembly can travel within its compression chamber. This is substantially less than its contracted length. In particular, a portion of the piston and shaft assembly must remain within the compression chamber, otherwise the attachment between the two is lost and the shock absorber is non-functional. I.e., there is a finite amount of space available in a vehicle suspension for the fully contracted length of a shock absorber, therefore prior art shocks absorbers are limited in expansion or stroke to a distance less than this finite space. Once this maximum is achieved, the connection between the wheels and the vehicle once more becomes a rigid connection, transmitting all motion to the passenger compartment.

In addition, shock absorbers generally utilize a single shaft. Thus, all of the force being transmitted through the wheels must be transmitted through this single shaft. This can lead to a great deal of wear on the shock absorbers. In fact, shock absorbers may wear out rather quickly in vehicles that tend to encounter rough terrain, such as off-road vehicles.

Accordingly, there is a need in the art for a shock absorber in which the distance between full contraction and full expansion or stroke is increased relative to the fully contracted length over conventional shock absorbers. In addition, there is a need in the art for the shock absorber to include multiple shafts.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a fluid based shock absorber. The fluid based shock absorber includes a first assembly. The first assembly includes a first compression chamber. The first assembly also includes a first sliding member. At least a portion of the first sliding member is configured to remain within the first compression chamber and the first sliding member is configured to move in a first direction relative to the first compression chamber.

Another example embodiment includes a fluid based shock absorber. The fluid based shock absorber includes a first assembly. The first assembly includes a first compression chamber. The first assembly also includes a first sliding member. At least a portion of the first sliding member is configured to remain within the first compression chamber and the first sliding member is configured to move in a first direction relative to the first compression chamber. The fluid based shock absorber also includes a second assembly. The second assembly includes a second compression chamber. The second assembly also includes a second sliding member. At least a portion of the second sliding member is configured to remain within the second compression chamber and the second sliding member is configured to move in a second direction relative to the second compression chamber.

Another example embodiment includes a fluid based shock absorber. The fluid based shock absorber includes a first assembly. The first assembly includes a first compression chamber. The first assembly also includes a first sliding member. At least a portion of the first sliding member is configured to remain within the first compression chamber and the first sliding member is configured to move in a first direction relative to the first compression chamber. The fluid based shock absorber also includes a second assembly. The second assembly includes a second compression chamber. The second assembly also includes a second sliding member. At least a portion of the second sliding member is configured to remain within the second compression chamber and the second sliding member is configured to move in a second direction relative to the second compression chamber. The fluid based shock absorber further includes a third assembly. The third assembly includes a third compression chamber. The third assembly also includes a third sliding member. At least a portion of the third sliding member is configured to remain within the third compression chamber and the third sliding member is configured to move in a first direction relative to the third compression chamber. The fluid based shock absorber additionally includes a fourth assembly. The fourth assembly includes a fourth compression chamber. The fourth assembly also includes a fourth sliding member. At least a portion of the fourth sliding member is configured to remain within the fourth compression chamber and the fourth sliding member is configured to move in a second direction relative to the fourth compression chamber. The fluid based shock absorber also includes a first reservoir. The first reservoir chamber includes a separating piston. The separating piston is configured to divide the first reservoir chamber into a reserve gas chamber and a reserve fluid chamber. The fluid based shock absorber further includes a second reservoir chamber. The second reservoir chamber includes a separating piston. The separating piston is configured to divide the second reservoir chamber into a reserve gas chamber and a reserve fluid chamber. The fluid based shock absorber additionally includes a first fluid channel. The first fluid channel connects the reserve fluid chamber of the first reservoir chamber to the first compression chamber and to the third compression chamber. The first fluid channel is configured to allow fluid to pass between the reserve fluid chamber of the first reservoir chamber, the first compression chamber and the third compression chamber. The fluid based shock absorber also includes a second fluid channel. The second fluid channel connects the reserve fluid chamber of the second reservoir chamber to the second compression chamber and to the fourth compression chamber. The second fluid channel is configured to allow fluid to pass between the reserve fluid chamber of the second reservoir chamber, the second compression chamber and the fourth compression chamber.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1A:
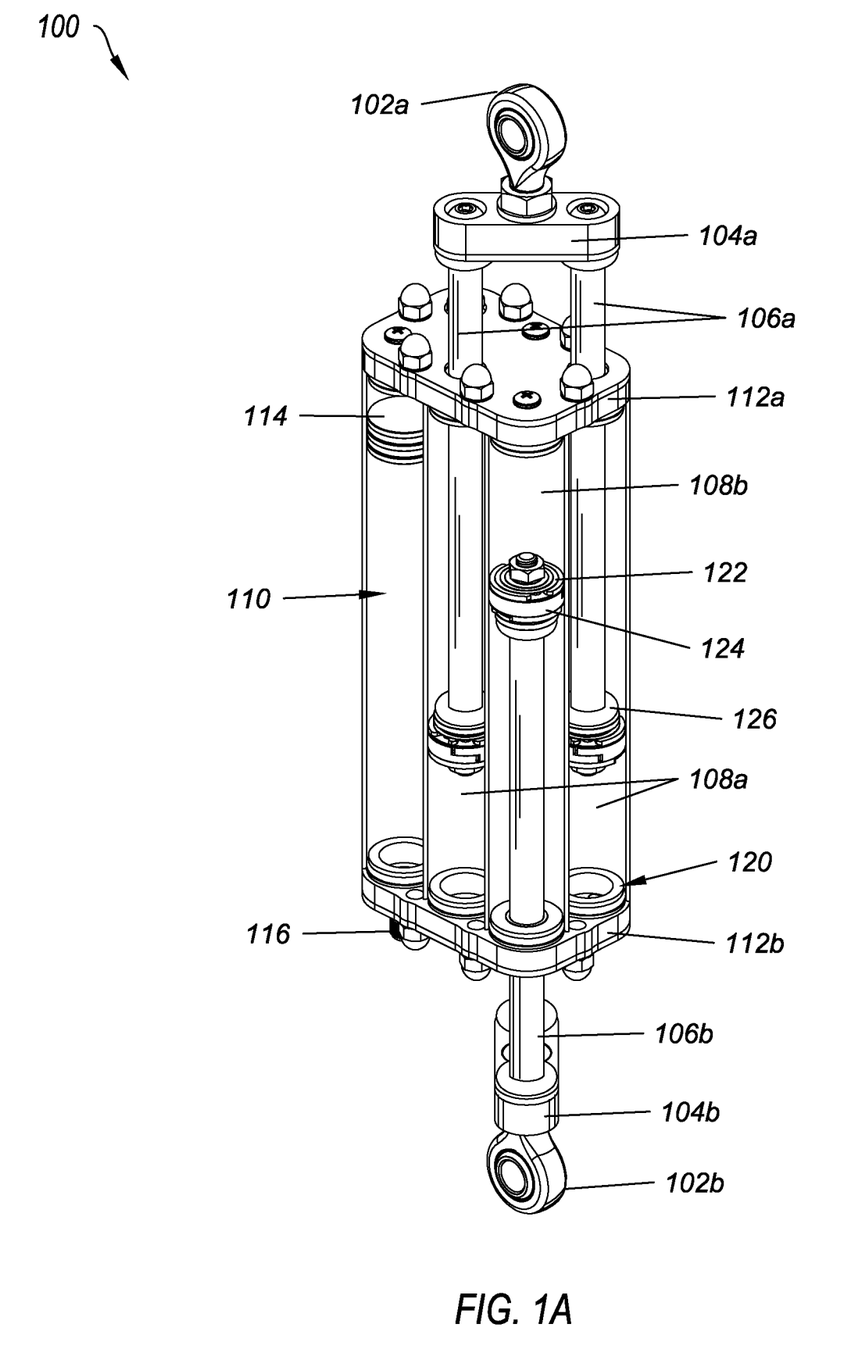
FIG. 1A illustrates a top perspective view of an example of a shock absorber.
Figure 1B:
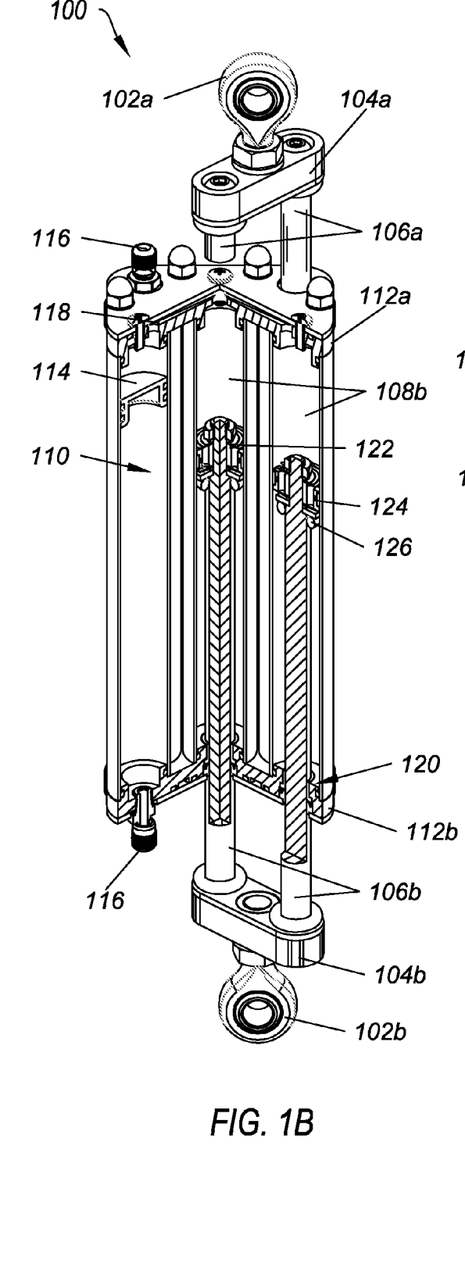
FIG. 1B illustrates a cut away view of the example of the shock absorber.
Figure 1C:
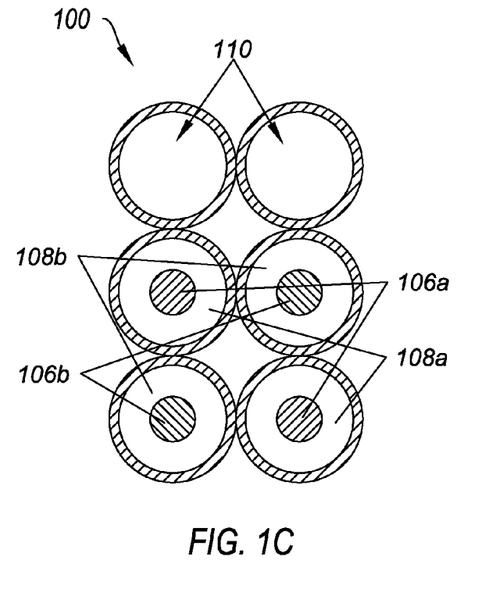
FIG. 1C illustrates a cross-sectional view of the example of the shock absorber.

FIGS. 1A, 1B and 1C illustrate an example of a shock absorber 100. FIG. 1A illustrates a top perspective view of example of a shock absorber 100; FIG. 1B illustrates a cut away view of the example of the shock absorber 100; and FIG. 1C illustrates a cross-sectional view of the example of the shock absorber 100. In at least one implementation, the shock absorber 100 can be used to prevent abrupt vertical movement of a vehicle. I.e., as a vehicle encounters a terrain change the shock absorber 100 can dissipate the energy and lessen the vertical movement of the passenger area of the vehicle.

FIGS. 1A, 1B and 1C show that the shock absorber 100 can include a first attachment 102a and a second attachment 102b (collectively "attachments 102"). In at least one implementation, the attachments 102 are configured to attach the shock absorber 100 to an external device, such as a vehicle. For example, the attachments 102 can include spherical ball joints with integrated lock nuts for securely locking the spherical ball joints in fixed positions. Additionally or alternatively, the attachments 102 can include a steel sleeve and cylindrical rubber bushing or a vertical threaded rod with sandwiched rubber disks.

FIGS. 1A, 1B and 1C also show that the shock absorber 100 can include a first end link 104a and a second end link 104b (collectively "end links 104"). In at least one implementation, the end links 104 can be connected to the attachments 102. I.e., as the external device transmits a force to the shock absorber 100, the force is transmitted through the attachments 102 to the end links 104 and through the end links 104 to the rest of the shock absorber 100. Likewise, as the shock absorber 100 provides a resisting force to the external device, the resisting force is transmitted through the end links 104 to the attachments 102 and through the attachments 102 to the external device.

FIGS. 1A, 1B and 1C further show that the shock absorber 100 can include a first set of sliding shafts 106a and a second set of sliding shafts 106b (collectively "sets of sliding shafts 106" or "sliding shafts 106"). In at least one implementation, the first set of sliding shafts 106a and the second set of sliding shafts 106b can be attached to the first end link 104a and the second end link 104b respectively. Attaching the sets of sliding shafts 106 to the end links 104 can ensure that the sliding shafts 106 within each set move in tandem with one another. Additionally or alternatively, the end links 104 prevent the sliding shafts 106 from from rotating relative to the end links 104. Preventing the sliding shafts 106 from rotating can improve ease of assembly, disassembly and maintenance of the shock absorber 100.

FIGS. 1A, 1B and 1C additionally show that the shock absorber 100 can include a first compression chamber 108a and a second compression chamber 108b (collectively "compression chambers 108"). In at least one implementation, each compression chamber 108 is configured to contain one of the sliding shafts 106. In particular, the sliding shafts 106 are allowed to move in a single direction within the compression chamber 108. In addition, the compression chamber 108 can contain a compression fluid which can dissipate applied forces, as described below. As used in the specification and the claims, the term fluid shall include a substance capable of flowing that is, changes its shape or volume when acted upon by a force. For example, a fluid can include a liquid or a gas.

FIGS. 1A, 1B and 1C also show that the shock absorber 100 can include one or more reservoir chambers 110. In at least one implementation, the reservoir chambers 110 can contain compressible fluid or gas. In particular, the additional compressible fluid or gas can allow the first set of sliding shafts 106a and the second set of sliding shafts 106b to move a large distance relative to one another. I.e., the first set of sliding shafts 106a and the second set of sliding shafts 106b can move the full distance within their respective compression chambers 108 by utilizing the compressible property of fluid or gas within the reservoir chambers 110.

FIGS. 1A, 1B and 1C further show that the shock absorber 100 can include a first end cap 112a and a second end cap 112b (collectively "end caps 112"). In at least one implementation, the sliding shafts 106 can pass through the end caps 112 such that a portion of the sliding shafts 106 remain within the compression chambers 108 and a portion remains outside of the compression chambers 108. In addition, the end caps 112 can keep the compression fluid within the compression chambers 108 and the compressible fluid within reservoir chambers 110. Additionally or alternatively, the end caps 112 can prevent external materials from entering the compression chambers 108 and the reservoir chambers 110. In at least one implementation, the end caps 112 can include one or more sealing bleed screws creating a removal plug and seal for the filling of compression fluid.

FIGS. 1A, 1B and 1C additionally show that the shock absorber 100 can include a separating piston 114 within each of the reservoir chambers 110. In at least one implementation, the separating piston 114 can divide the reservoir chamber 110 into a reserve gas chamber and a reserve fluid chamber. In particular, the separating piston 114 can include a seal between the perimeter of the separating piston 114 and the interior wall of the reservoir chamber 110 which creates a fluid/gas tight seal between the reserve gas chamber and the reserve fluid chamber.

FIGS. 1A, 1B and 1C also show that the shock absorber 100 can include a valve 116 on each of the reservoir chambers 110. In at least one implementation, the reservoir chamber 110 can be charged with gas pressure through the valve 116, creating a force against the separating piston 114, the force of the separating piston 114 against the fluid in the reserve fluid chamber pressurizes the fluid in the reserve fluid chamber to a similar pressure that is in the charged reserve gas chamber. Pressurizing the fluid via a pressurized reservoir chamber 100 reduces the chances of cavitation. Cavitation is the formation and then immediate implosion of cavities in a liquid—i.e. small liquid-free zones ("bubbles")—that are the consequence of forces acting upon the liquid. It usually occurs when a liquid is subjected to rapid changes of pressure that cause the formation of cavities where the pressure is relatively low.

FIGS. 1A, 1B and 1C further show that shock absorber 100 includes a fluid channel 118. In at least one implementation, the reserve fluid chamber is connected to the fluid in two of the compression chambers 108 via the fluid channel 118. The fluid channel 118 can allow the compression chambers 108 to be pressurized using the reservoir chamber 110. I.e., the reservoir chamber 110 and the connected compression chamber 108 can be equalized in pressure via the fluid channel 118. Pressurizing the fluid in the compression chamber 108 via a pressurized reservoir chamber 110 can allow the reservoir chamber 110 to compress and decompress via movement of the separating piston 114, allowing the sliding shafts 106 to move relative to the compression chamber 108.

In at least one implementation, two opposing reserve gas chambers can provide opposite extruding forces on the first set of sliding shafts 106 and the second set of sliding shafts 106. In particular, the reserve gas chamber in reservoir chamber 110 is independently charged via the valve 116. Reservoir chamber 110 in turn pressurizes the fluid in the compression chambers 108 containing the second set of sliding shafts 106b. This fluid pressure results in an extruding force that pushes the sliding shafts 106b downward and away from the main body assembly of the shock absorber 100.

An opposing reserve gas chamber is independently charged via the valve 116 at the top of FIGS. 1A, 1B and 1C. This opposing reserve gas chamber pressurizes the fluid in the two compression chambers 108 containing the first set of sliding shafts 106a. This fluid pressure results in an extruding force that pushes the first set of sliding shafts 106a upward and away from the main body assembly of the shock absorber 100.

Balancing the gas pressure in both opposing reserve gas chambers, results in equal and opposite extruding forces on the first set of sliding shafts 106a and the second set of sliding shafts 106b. Therefore as the first attachment 102a and the second attachment 102b move relative to one another in the normal operation of the shock absorber 100 the equal and opposite extruding forces on the first set of sliding shafts 106a and the second set of sliding shafts 106b keeps the main body assembly of the shock absorber 100 centrally located between the first attachment 102a and the second attachment 102b.

In addition, the fluid channel 118 can help prevent wear on the end links 104. In particular, during normal operation of the shock absorber 100 it is important that the forces applied by the two sliding shafts 106 connected to a particular end link 104 are equal. If the forces applied by the two sliding shafts 106 are unequal during the millions of cycles experienced by the shock absorber 100 the end links 104 would eventually fatigue and fail. The fluid channel 118 works as a pressure by-pass between the two compression chambers 108 associated with the two acting sliding shafts 106 connected to a single end link 104 (for example, between sliding shafts 106a and compression chambers 108a), assuring that the pressure in the two compression chambers 108 remain the same. I.e., the pressure balancing function of the fluid circuitry channel assures that the forces applied by the two sliding shafts 106 on the end links 104 are equal at all times during normal operation of the shock absorber 100.

FIGS. 1A, 1B and 1C additionally show that the shock absorber 100 can include transitions 120 between each of the sliding shafts 106 and the end caps 112. In at least one implementation, the transitions 120 can protect the sliding shafts 106 and the end caps 112 while the sliding shafts 106 are moving relative to the end caps 112. For example, the transitions 120 can include bearings which allow the sliding shafts 106 to move relative to the end caps 112 without causing extensive wear to either the sliding shafts 106 or the end caps 112. In addition, the transitions 120 can include bumpers such that the sliding shafts 106 do not damage the end caps 112 when the sliding shafts 106 reach the end on their range of movement. Additionally or alternatively, the transitions 120 can include seals which prevent the compression fluid from leaking out of the compression chambers 108 as the sliding shafts 106 either enter or exit the compression chambers 108.

FIGS. 1A, 1B and 1C also show that the shock absorber 100 can include a damping assembly 122 on each sliding shaft 106. In at least one implementation, the damping assembly 122 can prevent motion of the compression fluid around the damping assembly 122. I.e., the damping assembly 122 can form a seal with the compression chamber 108, preventing compression fluid from passing the damping assembly 122. Additionally or alternatively, the damping assembly 122 can include an integral valve system for controlled fluid flow through the damping assembly 122. For example, the integral valve system can include flexible disks located on both sides of a central piston that cover fluid passages through the central piston in order to control fluid flow from the fluid on one side of the damping assembly 122 to the other side of the damping assembly 122. Control of the fluid flow can allow the shock absorber 100 to compress or contract more slowly than it would otherwise compress or contract, reducing the "shock" felt by the external device.

FIGS. 1A, 1B and 1C further show that the shock absorber 100 can include a wear band 124 on each sliding shaft 106. In at least one implementation, the wear band 124 is located on the perimeter of the central piston allowing the damping assembly 122 to slide along the interior wall of the compression chamber 108 preventing substantial wear or damage to the compression chamber 108 or damping assembly 122. Additionally or alternatively, the wear band 124 also serves as a fluid seal between the compression chamber 108 and the damping assembly 122.

FIGS. 1A, 1B and 1C additionally show that the shock absorber 100 can include an internal bumper 126. In at least one implementation, the internal bumper 126 can prevent damage to either the damping assembly 122 or the compression chamber 108 when the sliding shaft 106 reaches the ends of the compression chamber 108. For example, the internal bumper 126 can include a rigid support disk separated from the flexible disks by a spacing washer. The rigid support disk can have dual functionality. For example, it can prevent the flexible disks from over flexing or permanently deforming. In addition, it can serve as a support plate for a stop. The stop can act as a protective layer preventing damage to both the damping assembly 122 and the compression chamber 108.

Figure 2A:
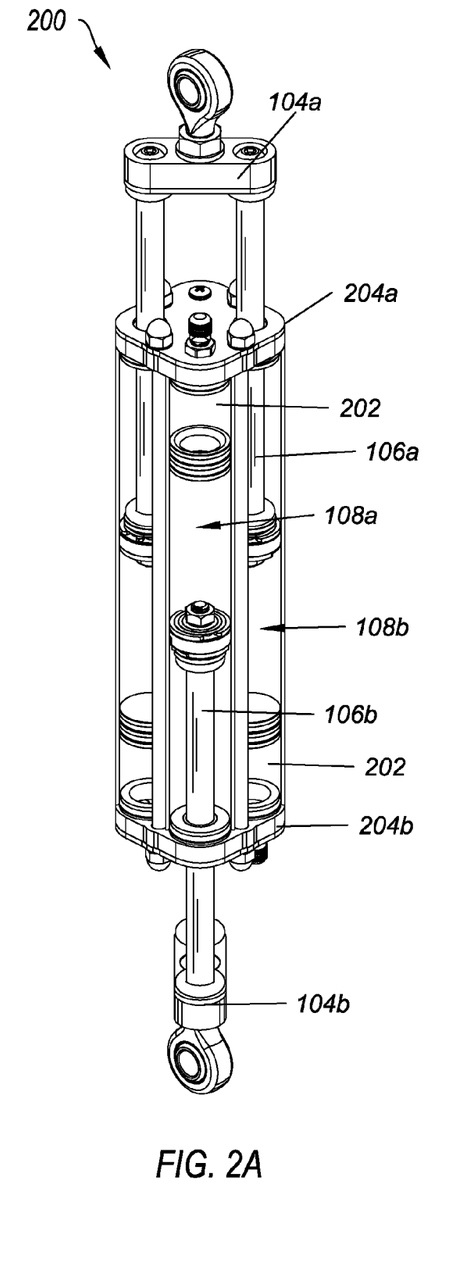
FIG. 2A illustrates a top perspective view of an alternative example of a shock absorber.
Figure 2B:
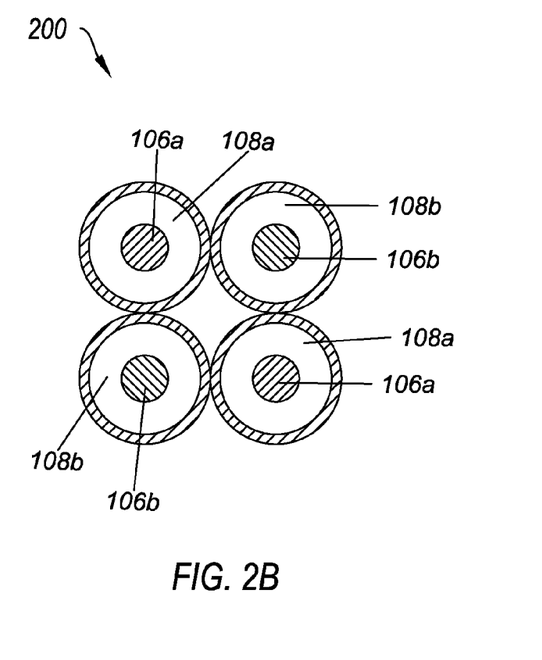
FIG. 2B illustrates a cross-sectional view of the alternative example of a shock absorber.

FIGS. 2A and 2B illustrate an alternative example of a shock absorber 200. FIG. 2A illustrates a top perspective view of the alternative example of a shock absorber 200; and FIG. 2B illustrates a cross-sectional view of the alternative example of a shock absorber 200. Though this configuration is cost effective and functional it does reduce the stroke or travel length of the shock absorber 200 relative to the fully compressed length of the shock absorber 200. In particular, the travel length of the shock absorber 200 is reduced relative to the shock absorber 100 of FIG. 1.

FIGS. 2A and 2B show that the shock absorber 200 can include a reserve gas chamber 202 that is not remote to the compression chamber 108. I.e., the reserve gas chamber 202 is located within the compression chamber 108. This configuration is commonly referred to as a Mono-Tube shock absorber. The function of the reserve gas chamber 202 is identical to that of reservoir chamber 110 in FIGS. 1A & 1B.

FIGS. 2A and 2B also show that the shock absorber 200 can include a first end cap 204a and a second end cap 204b (collectively "end caps 204"). In at least one implementation, the end caps 204 can include a gas circuitry channel (not visible in FIGS. 2A and 2B) similar to the fluid channel 118 in FIGS. 1A, 1B and 1C which connects the two reserve gas chambers 202 at the top of FIGS. 2A and 2B. An additional gas circuitry channel (not visible in FIGS. 2A and 2B), can be located in the second end cap 204b, similar to the fluid channel 118 in FIGS. 1A, 1B and 1C which connects the two reserve gas chambers 202 at the bottom of FIGS. 2A and 2B (one is not visible in FIGS. 2A and 2B). Connecting the associated reserve gas chambers 202 via a gas circuitry channel keeps the pressure in the associated two reserve gas chambers 202 equal and balanced, thus assuring that the forces applied by the two sliding shafts 106 on the end links 104 are equal at all times during normal operation of the shock absorber 200.

Figure 3A:
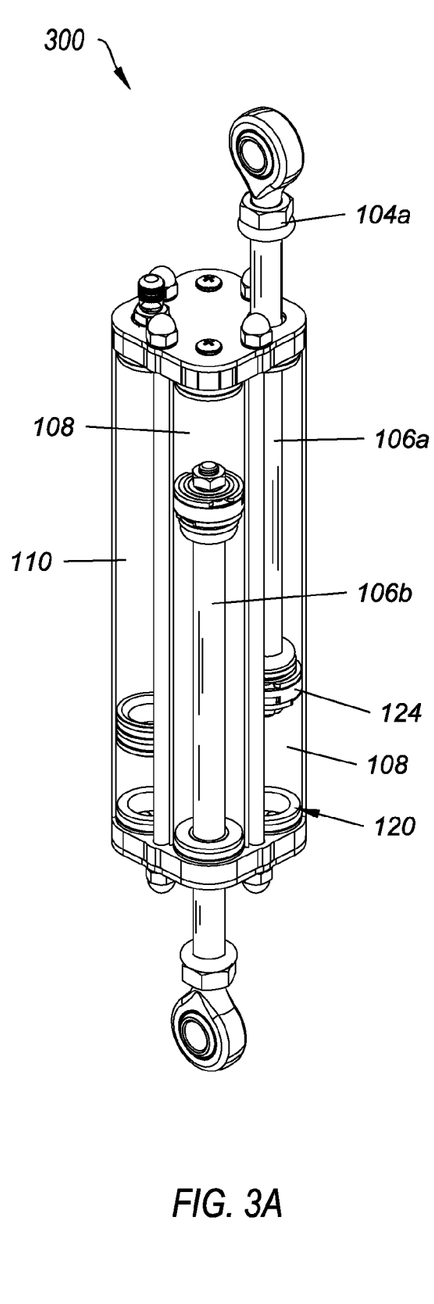
FIG. 3A illustrates a top perspective view of an alternative example of a shock absorber.
Figure 3B:
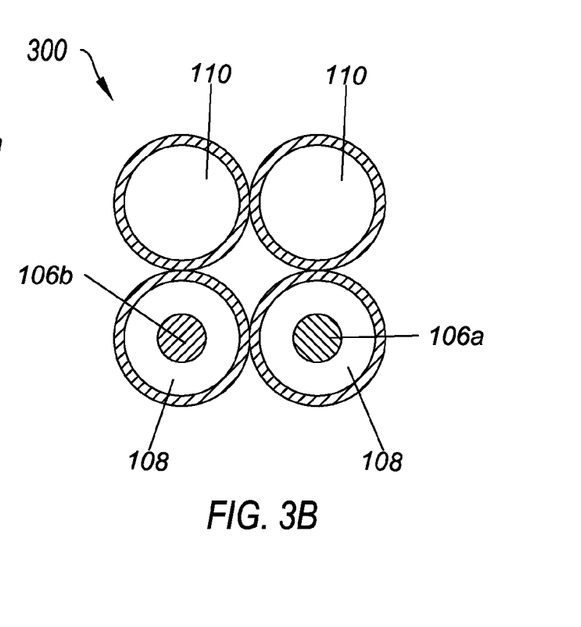
FIG. 3B illustrates a cross-sectional view of the alternative example of a shock absorber.

FIGS. 3A and 3B illustrate an alternative example of a shock absorber 300. FIG. 2A illustrates a top perspective view of the alternative example of a shock absorber 300; and FIG. 3B illustrates a cross-sectional view of the alternative example of a shock absorber 300. In at least one implementation, the shock absorber 300 is cost effective and reduces the size of the main body assembly relative to the shock absorber 100 of FIGS. 1A, 1B and 1C. In particular, the shock absorber 300 can include fewer sliding shafts than the shock absorber 100.

In at least one implementation, the shock absorber 300 includes only two compression chamber 108, two opposing reservoir chambers 110, and only a single sliding shaft 106 protruding from each end of the main body assembly of the shock absorber 300. One of skill in the art will appreciate that using a single sliding shaft 106 on each end means that the attachments 102 do not travel along the same axis, instead the attachments 102 travel along paths that are adjacent and parallel to one another. This adjacent and parallel motion applies bending moments to the sliding shafts 106, side loading to transition 120, and side loading to the wear band 124, all of which reduce the functional life of the shock absorber 300.

Figure 4A:
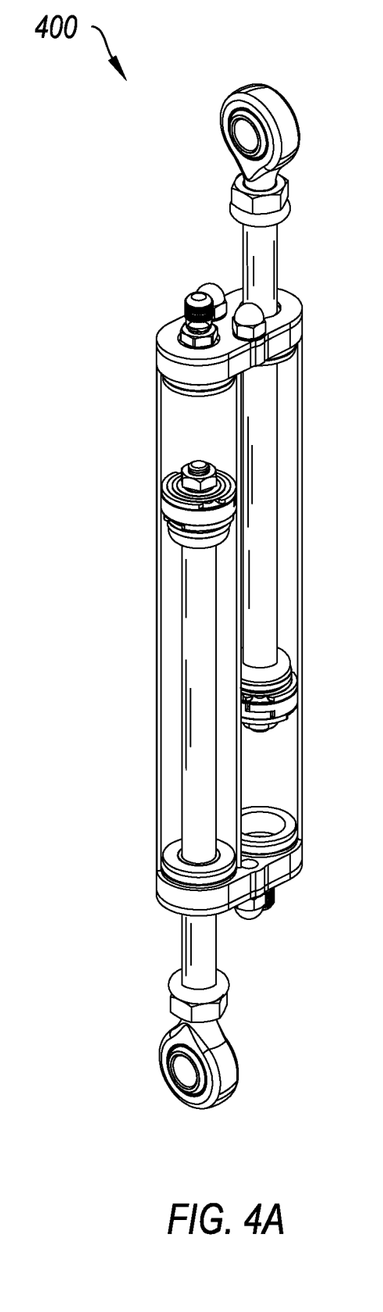
FIG. 4A illustrates a top perspective view of an example of an emulsion shock absorber.
Figure 4B:
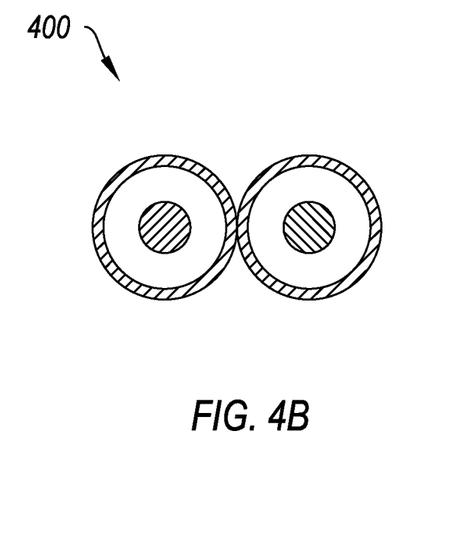
FIG. 4B illustrates a cross-sectional view of the example of an emulsion shock absorber.

FIGS. 4A and 4B illustrate an example of an emulsion shock absorber 400. FIG. 4A illustrates a toper perspective view of the example of an emulsion shock absorber 400; and FIG. 4B illustrates a cross-sectional view of the example of an emulsion shock absorber 400. In at least one implementation, the emulsion shock absorber 400 can include a mixture of two or more fluids which are normally immiscible (un-blendable). I.e., an emulsion can include one fluid (the dispersed phase) dispersed in another fluid (the continuous phase). For example, the emulsion fluid can include a mixture of approximately ⅔ liquid compression fluid and approximately ⅓ gas. The emulsion can be less dense than using only compression fluid. However, the valving in the emulsion shock absorber 400 must be stronger and more resistance to fluid flow.

Figure 5A:
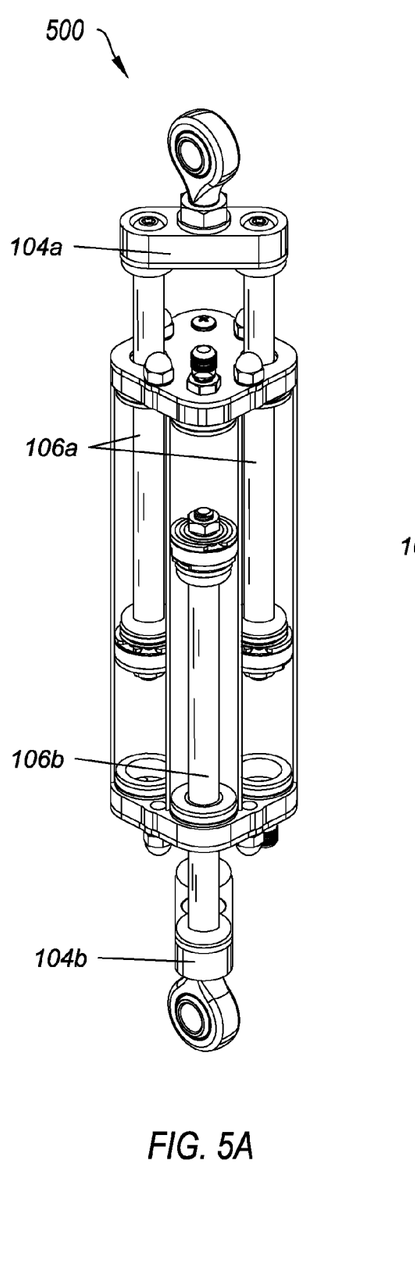
FIG. 5A illustrates a top perspective view of an alternative example of an emulsion shock absorber.
Figure 5B:
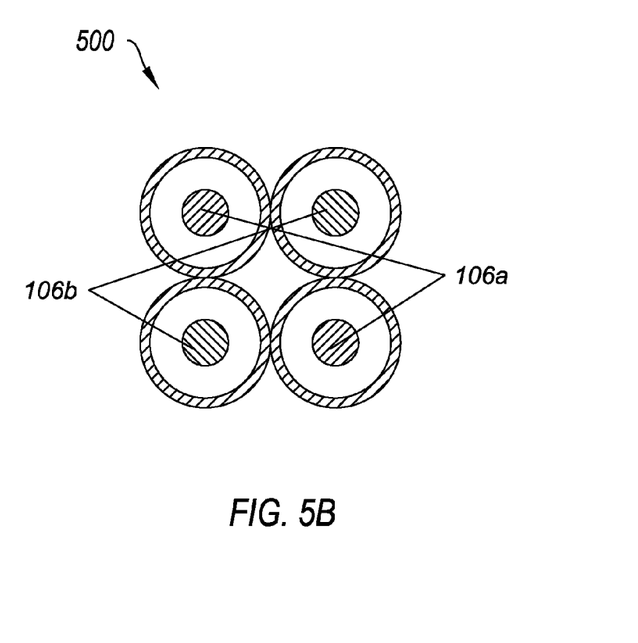
FIG. 5B illustrates a cross-sectional view of the alternative example of an emulsion shock absorber.

FIGS. 5A and 5B illustrate an example of an emulsion shock absorber 500. FIG. 5A illustrates a toper perspective view of the example of an emulsion shock absorber 500; and FIG. 5B illustrates a cross-sectional view of the example of an emulsion shock absorber 500. In at least one implementation, the emulsion shock absorber 500 can combine the emulsion shock absorber of FIG. 4 with the shafts 106a that move in a first direction and the shafts 106b that move in a second direction of FIG. 1. I.e., the emulsion shock absorber 500 can include a first end link 104a and a second end link 104b which distributes forces among the first set of shafts 106a and the second set of shafts 106b respectively.

Figure 6:
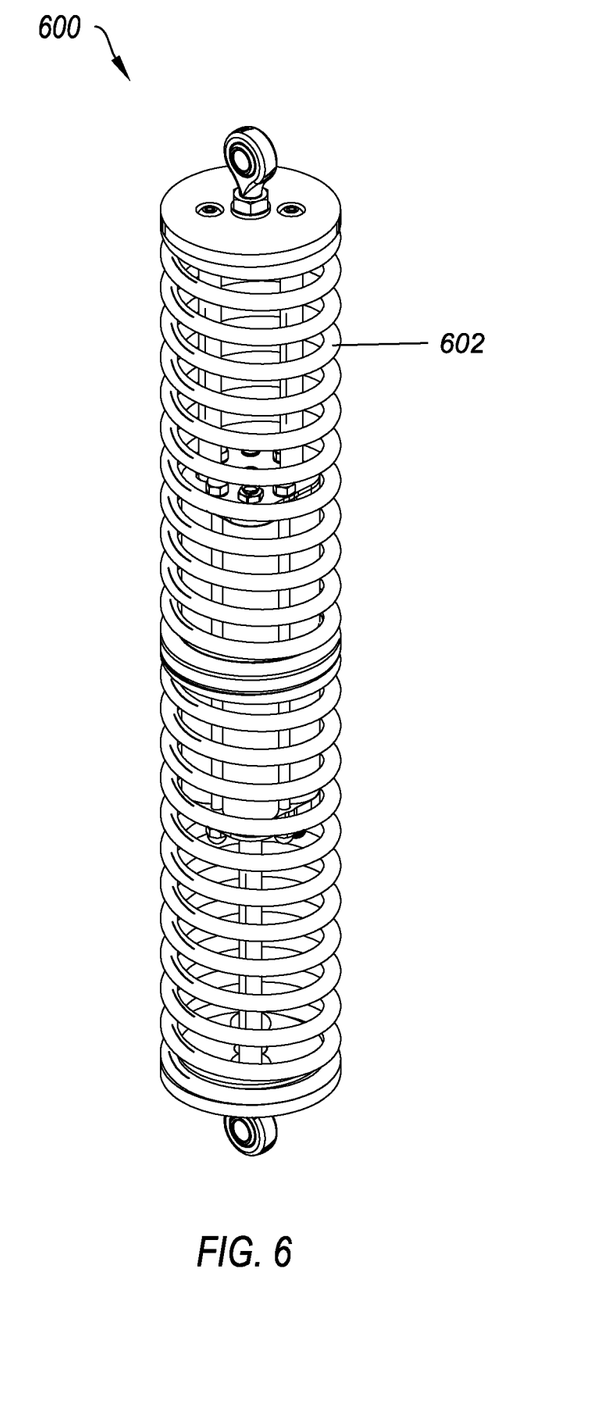
FIG. 6 illustrates an example of a coilover shock absorber.

FIG. 6 illustrates an example of a coilover shock absorber 600. In at least one implementation, the coilover shock absorber 600 can be combined with a Mono-Tube gas reserve type shock absorber or Emulsion type shock absorber as described above. I.e., the coilover shock absorber 600 can be applied to either a mono-tube gas reserve shock absorber, such as the shock absorber 200 of FIG. 2 or an emulsion shock absorber, such as the emulsion shock absorber 400 of FIG. 4.

Figure 7:
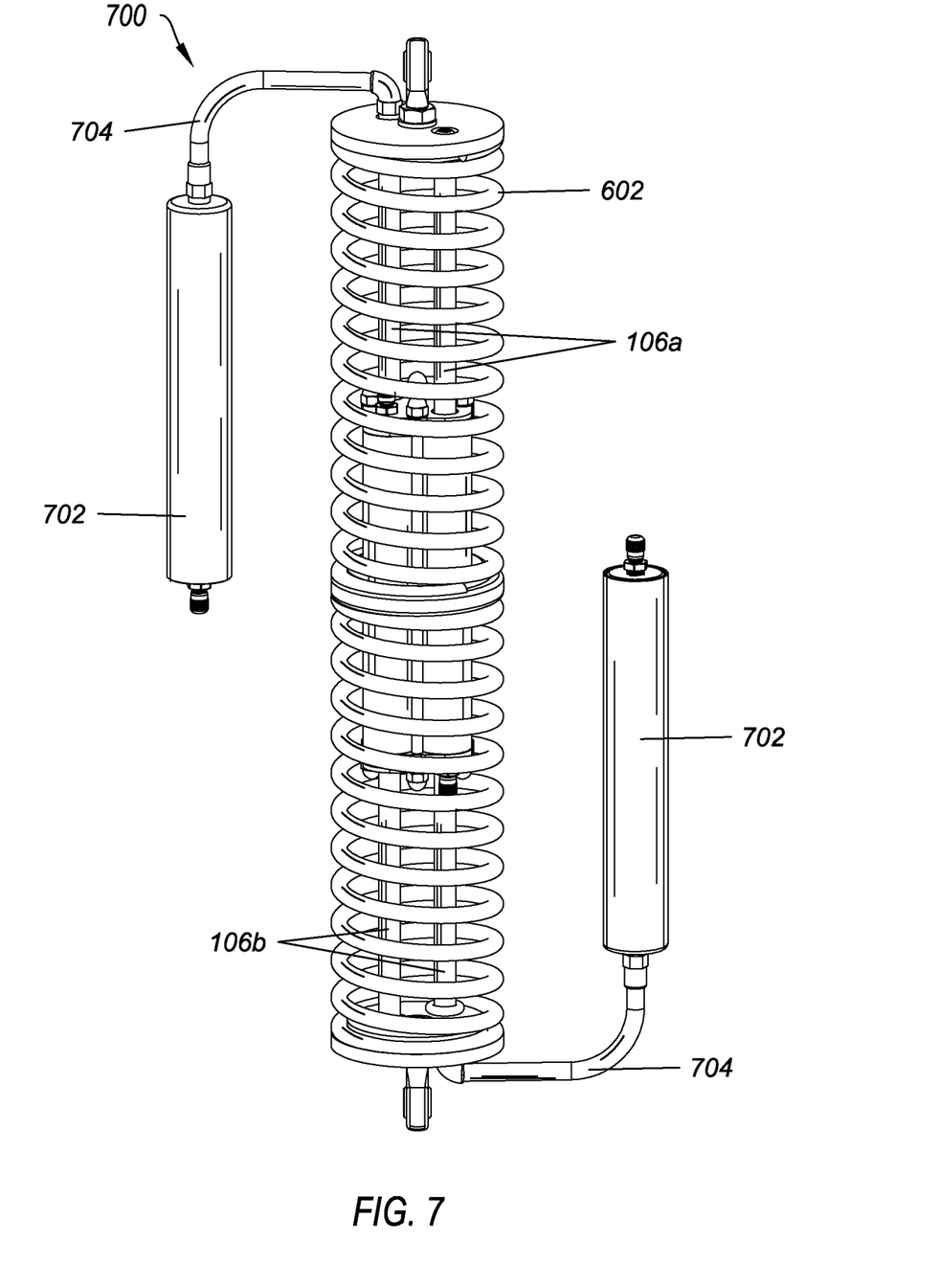
FIG. 7 illustrates an alternative example of a coilover shock absorber.

FIG. 6 shows that the shock absorber 600 can include a coil spring 602. In at least one implementation, the coil spring 602 spans from the first attachment 102a at one end of the shock absorber 600 to the second attachment 102b at the other end of the shock absorber 600. Additionally or alternatively, the coil spring can include a first spring that covers at least a portion of the first set of sliding shafts 106a and a second spring that covers at least a portion of the second set of sliding shafts 106b FIG. 7 illustrates an alternative example of a coilover shock absorber 700. In at least one implementation, the coilover shock absorber 700 combines the coil spring 602 of FIG. 6 with the remote gas reserve technology as described above.

FIG. 7 shows that the coilover shock absorber 700 can include one or more reservoir chambers 702. In at least one implementation, the reservoir chambers 702 can contain compressible fluid or gas. In particular, the additional compressible fluid or gas can allow the first set of sliding shafts 106a and the second set of sliding shafts 106b to move a large distance relative to one another. I.e., the first set of sliding shafts 106a and the second set of sliding shafts 106b can move the full distance within their respective compression chambers by utilizing the compressible property of fluid or gas within the reservoir chambers 702.

FIG. 7 also shows that the coilover shock absorber 700 can include a connector 704. In at least one implementation, the reservoir chamber 702 is connected to the fluid the compression chambers via the connector 704. I.e., the reservoir chamber 702 and the connected compression chamber 108 can exchange compression fluid via the connector 704. For example, the connector 704 can include a hose or other fluid connector.

Figure 8:
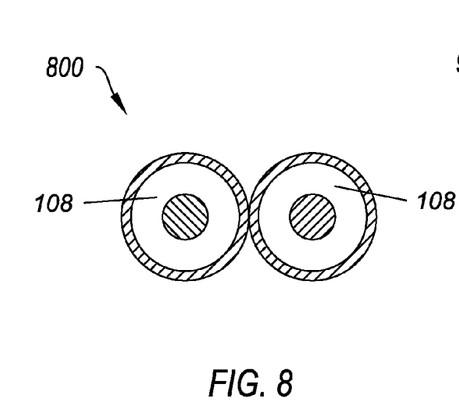
FIG. 8 illustrates a cross-sectional view of an alternative shock absorber.

FIG. 8 illustrates a cross-sectional view of an alternative shock absorber 800. In at least one implementation, the shock absorber includes the Mono-Tube configuration described in the example of FIG. 2 combined with the example of FIG. 4. I.e., the shock absorber 800 can be further reduced in size to just two compression chambers 108 with integral reserve gas chambers 202 of FIG. 2. This example would be most cost effective and further reduce the size of the main body assembly into just two compression chamber 108. This example, however, would also have the reduced travel or stroke inherent in the example of FIG. 2 as well as the reduced functional life inherent in the example of FIG. 3.

Figure 9:
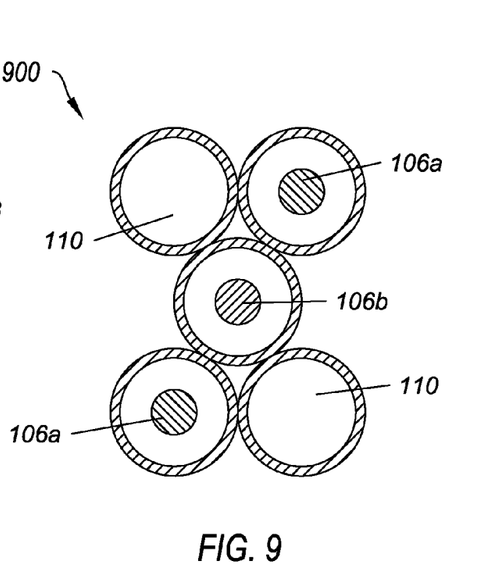
FIG. 9 illustrates a cross-sectional view of an alternative shock absorber.

FIG. 9 illustrates a cross-sectional view of an alternative shock absorber 900. In at least one implementation, the shock absorber 900 can include a pair of sliding shafts 106a opposite a single sliding shaft 106b. This can remove the problems of parallel motions rather than opposing motions as discussed with regard to FIG. 3. The three sliding shafts 106 can be combined with two reservoir chambers 110, as discussed with regard to FIG. 1.

Figure 10:
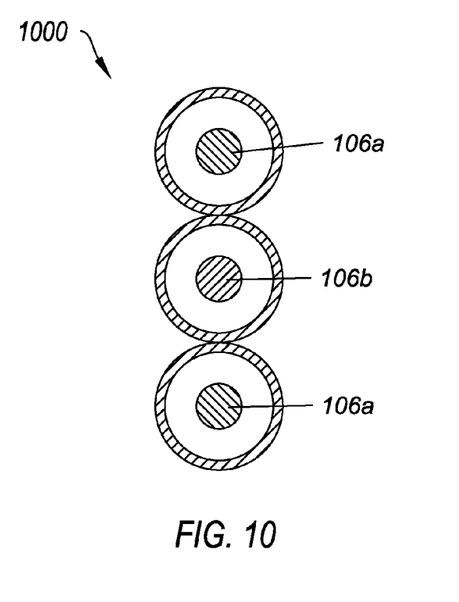
FIG. 10 illustrates a cross-sectional view of an alternative shock absorber.

FIG. 10 illustrates a cross-sectional view of an alternative shock absorber 1000. In at least one implementation, the shock absorber 1000 can include a pair of sliding shafts 106 opposite a single sliding shaft 106. This can remove the problems of parallel motions rather than opposing motions as discussed with regard to FIG. 3. The three sliding shafts 106 can be combined with either a mono-tube gas reserve shock absorber, such as the shock absorber 200 of FIG. 2 or an emulsion shock absorber, such as the emulsion shock absorber 400 of FIG. 4.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid based shock absorber, the fluid based shock absorber comprising:
   a first assembly, wherein the first assembly includes:
      a first compression chamber; and
      a first sliding member, wherein:
         at least a portion of the first sliding member is configured to remain within the first compression chamber; and
         the first sliding member is configured to move in a first direction relative to the first compression chamber; and
   a second assembly, wherein the second assembly includes:
      a second compression chamber; and
      a second sliding member, wherein:
         at least a portion of the second sliding member is configured to remain within the second compression chamber; and
         the second sliding member is configured to move in a second direction relative to the second compression chamber;
   wherein the first direction is opposite the second direction;
   a third assembly, wherein the third assembly includes:
      a third compression chamber; and
      a third sliding member, wherein:
         at least a portion of the third sliding member is configured to remain within the third compression chamber; and
         the third sliding member is configured to move in the first direction relative to the third compression chamber:
   a fourth assembly, wherein the fourth assembly includes:
      a fourth compression chamber; and
      a fourth sliding member, wherein:
         at least a portion of the fourth sliding member is configured to remain within the fourth compression chamber; and
         the fourth sliding member is configured to move in the second direction relative to the fourth compression chamber:
   a first end link, wherein the first end link is configured to attach to the first sliding shaft and the third sliding shaft; and
   a second end link, wherein the second end link is configured to attach to the second sliding shaft and the fourth sliding shaft;
   wherein the combined distance that the first sliding member and the second sliding member are configured to move is greater than the length of the first compression chamber.

2. The fluid based shock absorber of claim 1, wherein the first direction is parallel to the second direction.

3. The fluid based shock absorber of claim 2, wherein the first direction is away from the first compression chamber.

4. The fluid based shock absorber of claim 3, wherein the second direction is away from the second compression chamber.

5. The fluid based shock absorber of claim 1, wherein the first assembly is adjacent to the second assembly.

6. The fluid based shock absorber of claim 1 further comprising a spring coil, wherein the spring coil wraps around at least a portion of the first sliding member.

7. The fluid based shock absorber of claim 1 further comprising a separating piston, wherein the separating piston is configured to divide the first compression chamber into:
   a fluid chamber; and
   a reserve gas chamber.

8. The fluid based shock absorber of claim 1 further comprising a damping assembly, wherein the damping assembly is attached to the end of the first sliding shaft within the first compression chamber.

9. A fluid based shock absorber, the fluid based shock absorber comprising:
   a first assembly, wherein the first assembly includes:
      a first compression chamber; and
      a first sliding member, wherein:

at least a portion of the first sliding member is configured to remain within the first compression chamber; and the first sliding member is configured to move in a first direction relative to the first compression chamber;

a second assembly, wherein the second assembly includes:
a second compression chamber; and
a second sliding member, wherein:
at least a portion of the second sliding member is configured to remain within the second compression chamber; and
the second sliding member is configured to move in a second direction relative to the second compression chamber;

a third assembly, wherein the third assembly includes:
a third compression chamber; and
a third sliding member, wherein:
at least a portion of the third sliding member is configured to remain within the third compression chamber; and
the third sliding member is configured to move in the first direction relative to the third compression chamber;

a fourth assembly, wherein the fourth assembly includes:
a fourth compression chamber; and
a fourth sliding member, wherein:
at least a portion of the fourth sliding member is configured to remain within the fourth compression chamber; and
the fourth sliding member is configured to move in the second direction relative to the fourth compression chamber;

a first fluid channel, wherein the first fluid channel:
connects the first compression chamber to the third compression chamber; and
is configured to allow fluid to pass between the first compression chamber and the third compression chamber; and a second fluid channel, wherein the second fluid channel:
connects the to the second compression chamber to the fourth compression chamber; and
is configured to allow fluid to pass between the second compression chamber and the fourth compression chamber;

a first end link, wherein the first end link is configured to attach to the first sliding shaft and the third sliding shaft; and a second end link, wherein the second end link is configured to attach to the second sliding shaft and the fourth sliding shaft;

wherein the combined distance that the first sliding member and the second sliding member are configured to move is greater than the length of the first compression chamber.

10. The fluid based shock absorber of claim 9 further comprising:
a second reservoir chamber, wherein the second reservoir chamber includes:
a separating piston, wherein the separating piston is configured to divide the second reservoir chamber into:
a reserve gas chamber; and
a reserve fluid chamber.

11. The fluid based shock absorber of claim 10 further comprising:
a first fluid channel, wherein the fluid channel:
connects the reserve fluid chamber of the first reservoir chamber to the first compression chamber; and
is configured to allow fluid to pass between the reserve fluid chamber of the first reservoir chamber and the first compression chamber; and
a second fluid channel, wherein the fluid channel:
connects the reserve fluid chamber of the second reservoir chamber to the second compression chamber; and
is configured to allow fluid to pass between the reserve fluid chamber of the second reservoir chamber and the second compression chamber.

12. The fluid based shock absorber of claim 11 further comprising:
a third assembly, wherein the third assembly includes:
a third compression chamber; and
a third sliding member, wherein:
at least a portion of the third sliding member is configured to remain within the third compression chamber; and
the third sliding member is configured to move in the first direction relative to the third compression chamber;
wherein the first fluid channel:
connects the reserve fluid chamber of the first reservoir chamber to the third compression chamber; and
is configured to allow fluid to pass between the reserve fluid chamber of the first reservoir chamber and the third compression chamber.

13. The fluid based shock absorber of claim 12 further comprising:
a fourth assembly, wherein the fourth assembly includes:
a fourth compression chamber; and
a fourth sliding member, wherein:
at least a portion of the fourth sliding member is configured to remain within the fourth compression chamber; and
the fourth sliding member is configured to move in the second direction relative to the fourth compression chamber;
wherein the second fluid channel:
connects the reserve fluid chamber of the second reservoir chamber to the fourth compression chamber; and
is configured to allow fluid to pass between the reserve fluid chamber of the second reservoir chamber and the fourth compression chamber.

14. A fluid based shock absorber, the fluid based shock absorber comprising:
a first assembly, wherein the first assembly includes:
a first compression chamber; and
a first sliding member, wherein:
at least a portion of the first sliding member is configured to remain within the first compression chamber; and
the first sliding member is configured to move in a first direction relative to the first compression chamber;
a second assembly, wherein the second assembly includes:
a second compression chamber; and
a second sliding member, wherein:
at least a portion of the second sliding member is configured to remain within the second compression chamber; and
the second sliding member is configured to move in a second direction relative to the second compression chamber;
a third assembly, wherein the third assembly includes:
a third compression chamber; and a third sliding member, wherein:
    at least a portion of the third sliding member is configured to remain within the third compression chamber; and
    the third sliding member is configured to move in the first direction relative to the third compression chamber;
a fourth assembly, wherein the fourth assembly includes:
    a fourth compression chamber; and
    a fourth sliding member, wherein:
        at least a portion of the fourth sliding member is configured to remain within the fourth compression chamber; and
        the fourth sliding member is configured to move in the second direction relative to the fourth compression chamber;
a first reservoir chamber, wherein the first reservoir chamber includes:
    a separating piston, wherein the separating piston is configured to divide the first reservoir chamber into:
        a reserve gas chamber; and
        a reserve fluid chamber;
a second reservoir chamber, wherein the second reservoir chamber includes:
    a separating piston, wherein the separating piston is configured to divide the second reservoir chamber into:
        a reserve gas chamber; and
        a reserve fluid chamber;
a first fluid channel, wherein the first fluid channel:
    connects the reserve fluid chamber of the first reservoir chamber to the first compression chamber and to the third compression chamber; and
    is configured to allow fluid to pass between the reserve fluid chamber of the first reservoir chamber, the first compression chamber and the third compression chamber;
a second fluid channel, wherein the second fluid channel:
    connects the reserve fluid chamber of the second reservoir chamber to the second compression chamber and to the fourth compression chamber; and
    is configured to allow fluid to pass between the reserve fluid chamber of the second reservoir chamber, the second compression chamber and the fourth compression chamber
a first end link, wherein the first end link is configured to attach to the first sliding shaft and the third sliding shaft; and
a second end link, wherein the second end link is configured to attach to the second sliding shaft and the fourth sliding shaft.

15. The fluid based shock absorber of claim 14 further comprising:
    a first attachment, wherein the first attachment is configured to connect the first end link to an external device; and
    a second attachment, wherein the second attachment is configured to connect the second end link to the external device.

* * * * *